United States Patent [19]

Didner

[11] Patent Number: 4,479,604
[45] Date of Patent: Oct. 30, 1984

[54] ZONED CONTROL SYSTEM

[76] Inventor: Robert S. Didner, 29 Skyline Dr., Morristown, N.J. 07960

[21] Appl. No.: 454,834

[22] Filed: Dec. 30, 1982

[51] Int. Cl.³ .......................... F24F 7/00; F24F 3/00; F23M 5/20
[52] U.S. Cl. .................................. 236/49; 236/46 R; 165/22
[58] Field of Search ..................... 165/22, 12; 236/51, 236/46 R; 364/557, 418, 505, 571

[56] References Cited

U.S. PATENT DOCUMENTS

| | | |
|---|---|---|
| 3,024,007 | 6/1962 | Gordon . |
| 3,267,994 | 8/1966 | Sones et al. . |
| 3,567,115 | 12/1970 | Nelson . |
| 3,716,096 | 2/1973 | Berrett et al. . |
| 3,724,534 | 4/1973 | Weatherston . |
| 3,882,928 | 5/1975 | Gazzo ............................... 165/22 X |
| 3,896,871 | 7/1975 | Pecararo . |
| 3,933,197 | 1/1976 | Zimmer . |
| 4,013,118 | 3/1977 | Zimmer . |
| 4,071,745 | 1/1978 | Hall . |
| 4,110,827 | 8/1978 | Shaut . |
| 4,123,796 | 10/1978 | Shih . |
| 4,153,945 | 5/1979 | Actor et al. . |
| 4,172,555 | 10/1979 | Levine ............................... 236/47 X |
| 4,200,910 | 4/1980 | Hall . |
| 4,205,381 | 5/1980 | Games et al. . |
| 4,212,078 | 7/1980 | Games et al. . |
| 4,215,408 | 7/1980 | Games et al. . |
| 4,217,646 | 8/1980 | Caltagirone et al. . |
| 4,284,126 | 8/1981 | Dawson . |
| 4,289,272 | 9/1981 | Murase et al. . |
| 4,293,027 | 10/1981 | Tepe et al. . |
| 4,293,028 | 10/1981 | Knoll . |
| 4,298,946 | 11/1981 | Hartsell et al. . |
| 4,308,911 | 1/1982 | Mandl . |
| 4,311,188 | 1/1982 | Kojima et al. . |

FOREIGN PATENT DOCUMENTS 2040080 8/1980 United Kingdom .................. 165/22

Primary Examiner—William E. Wayner
Assistant Examiner—J. Sollecito
Attorney, Agent, or Firm—Thomas L. Adams

[57] ABSTRACT

In this thermal system there is a central plant feeding a plurality of adjustable zone regulators which bring their respective zones to corresponding target temperatures. The system has a controller including a plurality of temperature sensors. The sensors are distributed one to a zone. Each of the sensors can produce a zone signal signifying zone temperature. The controller also has a plurality of zone actuators, each having a zone control terminal. Each of the actuators can, in response to a signal at its zone control terminal, adjust a corresponding one of the zone regulators. Also included is a control subsystem that is coupled to each of the temperature sensors and to the zone control terminal of each of the zone actuators. The control subsystem can start the central plant in response to a predetermined function of the zone temperature errors with respect to their respective target temperatures exceeding a given limit. The control subsystem can also apply corresponding signals to each zone control terminal, with a timing determined by its corresponding temperature error.

18 Claims, 4 Drawing Figures

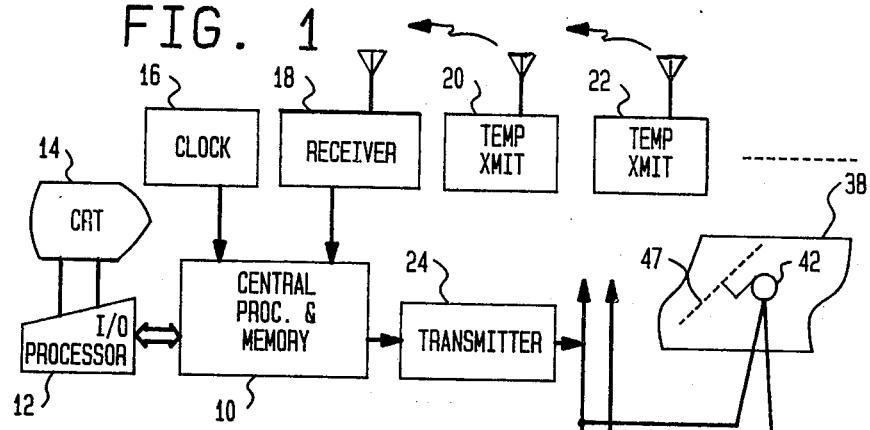
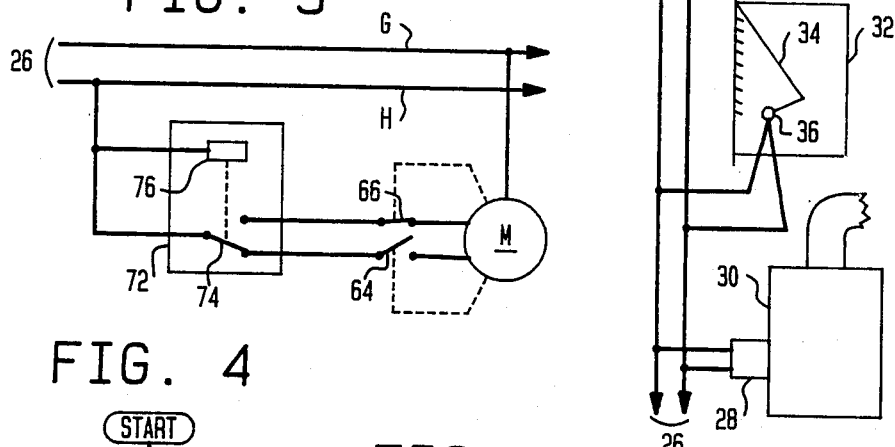
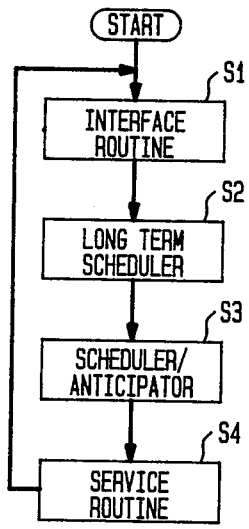
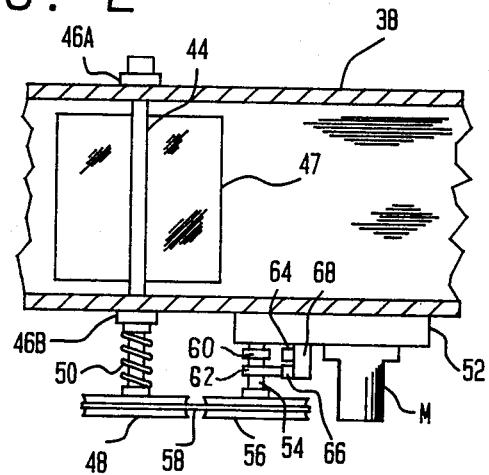

ZONED CONTROL SYSTEM

BACKGROUND OF THE INVENTION

The present invention relates to zoned heating and cooling systems and, in particular, to systems having a plurality of temperature sensors for separately regulating zone temperatures.

It is known to have a zoned heating or cooling system wherein a heating or cooling plant can operate either continuously or in response to demands from various zones. The continuous-operation system serves to distribute the output of a furnace or air conditioning unit to those zones requiring temperature adjustment. Such a system requires a plant with adjustable output levels. Most existing plants, especially in smaller installations such as homes, do not possess such an adjustable plant. The alternative method is a central plant which is started whenever one zone demands service. However, the central plant may be started for many consecutive short intervals, merely to service individual zones, which results in a highly inefficient firing sequence.

It is also known (U.S. Pat. No. 3,724,534) to employ a scanner that is coupled to a plurality of zone thermostats. Such a system can adjust the overall heating and cooling according to the sum of the zone requirements. However, while this method tends to respond to the cumulative needs of the entire system, it does not differentiate between the separate zones to direct more or less of the central plant's output to an individual zone requiring a large amount of service. Accordingly, such a system may result in an overshoot or undershoot of a zone's target temperature.

It is also known to employ a digital, programmable, wall thermostat for controlling heating and cooling systems. This system can include a digital processor with memory which responds to temperature sensors. While the system can schedule heating changes, it does not consider the specific requirements associated with zone heating or cooling.

Other known heating or cooling systems involve computer control, such that periods of time are divided into two intervals wherein the computer can consider a rapid heating or rapid cooling curve. These systems can consider outside weather conditions. However, such systems (U.S. Pat. No. 4,293,028) do not consider the specific requirements for regulating multiple zones in an efficient manner.

Also relevant are U.S. Pat. Nos. 4,200,910; 3,024,007; 4,215,408; 4,308,911 and 4,123,796.

Basic problems preventing the use of multiple zone heating/cooling in small environments, such as the home are: (1) the first cost, and (2) the great difficulty in regulating heating systems (forced air, for example), to provide efficient zoned heating. For example, a straightforward approach to achieve zoned heating with forced hot air is to provide separate room thermostats, so that the furnace is fired whenever a zone falls below a predetermined comfort level. The problem with this concept, as described above, is that the zones can demand heat randomly. It is, therefore, likely that the furnace will be cycling frequently to supply heat to the numerous unsynchronized zones. Starting the furnace for many brief intervals tends to be relatively inefficient because of a warm-up interval wherein energy is consumed in a furnace before useful heat is delivered from it.

Another advantage of using the foregoing is the possibility of preventing air conditioner evaporation coil icing which often occurs when airflow is restricted. Airflow is restricted when one or more zones are deactivated.

SUMMARY OF THE INVENTION

In accordance with the illustrative embodiment demonstrating features and advantages of the present invention, a controller is provided in a thermal system. The controller has a central plant feeding a plurality of adjustable zone regulators which bring their respective zones to corresponding target temperatures. The controller has a plurality of temperature sensors and a plurality of zone actuators. The temperature sensors, distributed one to a zone, each produce a zone signal signifying zone temperature. The zone actuators each have a zone control terminal. Each actuator can, in response to a signal at its zone control terminal, operate to adjust a corresponding one of the zone regulators. The controller also has a control means coupled to each of the temperature sensors and to the zone control terminal of each zone actuator for starting the central plant. The central plant is started in response to a predetermined function of the zone temperature errors (with respect to their respective target temperatures) exceeding a given limit. The control means can apply corresponding signals to each zone control terminal with a timing determined by the zone's temperature error.

In related method of the same invention temperatures are regulated with a central plant feeding a plurality of zone regulators at respective zones. The method includes the following steps: (1) measuring the error in temperature in each zone and the corresponding target temperatures, (2) calculating a cumulative value from a predetermined function of the errors, (3) starting the central plant when the cumulative value exceeds a predetermined limit, and (4) adjusting each of the zone regulators to an extent determined by its corresponding error in temperature.

By employing equipment and methods set forth above, an improved heating or cooling system can provide delivery of heated or cooled air to separate zones. In a preferred embodiment, the system considers the temperature error in each of the zones. When the sum of the errors exceeds a given number, the furnace or air conditioner can be started. By awaiting a cumulative error that exceeds a given limit, the thermal cycling of the rooms is brought into synchrony. To this end, the preferred embodiment heats or cools each room to about two degrees past the respective target temperature. Each room is, thus, placed at a high point in its thermal cycle, thereby tending to sychronize the thermal cycling of all rooms. Thereafter, the rooms tend to reverse their temperature trend, but in a generally synchronous manner.

This preferred embodiment also allows the various target temperatures to be scheduled by means of a processor. Preferably a central processor and digital memory interfaces with another processor that has input and output devices. When used together, the processors seek target temperatures which targets can be adjusted by the user to fit his/her daily, weekly and monthly patterns.

As a further feature, the various zone temperature sensors and the several actuators (for the duct dampers, registers and furnace controls) are coupled to the central processor by means of a carrier frequency (120 kHz) induced into the house wiring. This feature greatly reduces installation cost.

The preferred embodiment has a routine for estimating the time required to change a zone temperature from its current temperature to its next scheduled target temperature. The processor periodically determines whether it is timely to start the heating or cooling system, in order to reach the desired target. To increase accuracy, the preferred embodiment employs an outside temperature sensor, which is coupled by a radio frequency telemeter to the central processor. The difference between the temperatures inside and outside the house, is used to estimate the time required to change zone temperature to the next target. In a highly preferred embodiment, the trajectory of the temperature changes is adjusted for the normally expected, daily cycling of outside temperature.

BRIEF DESCRIPTION OF THE DRAWINGS

The brief desription set forth above, as well as other objects, features and advantages of the present invention, will be more fully appreciated by referring to the detailed description and the drawings that follow. The description is of the presently preferred but, nontheless, illustrative embodiment in accordance with the present invention, when taken in conjunction with the accompanying drawings wherein:

FIG. 1 is a block diagram of a controller according to the principles of the present invention;

FIG. 2 is a cross-sectional plan view of the actuator and regulator shown in FIG. 1;

FIG. 3 is a schematic diagram of the actuator of FIG. 2; and

FIG. 4 is a flow chart showing the various programming steps associated with the processor of FIG. 1.

DETAILED DESCRIPTION OF THE PREFERRED EMBODIMENT

Shown in FIG. 1 is a thermal system having a controller. A control means, is designated by the number 10, is an eight bit microprocessor, such as Model No. Z80A, by Zilog, a subsidiary of Exxon, Inc.; although, clearly, other digital processors may be used instead. The microprocessor cooperates with a conventional memory, preferably one which includes four kilobytes of random access memory and sixteen kilobytes of read only memory. Other memory configurations may be chosen, depending upon the complexity of the planned operations. Control means 10 includes a processor 12, which has an output device such as a cathode ray tube 14 (CRT) (a keyboard type input means) and a nonvolatile storage means such as a cassette tape recorder or disk drive for parametric data. CRT 14 can be an ordinary television. Processor 12 is preferably a "home" computer, such as an Apple II or a competing model (ZX 81) from Sinclair Corp. It is expected that processors 12 and 10 can be programmed by including an appropriate read only memory for each. Data are applied to processor 10 by a conventional digital clock 16, which has data output compatible with processor 10. Additional digital data are provided to processor 10 by receiver 18. In one embodiment, receiver 18 is an FM receiver used to receive digital data and store it via an internal universal asynchronous receiver transmitter (UART). The data provided by receiver 18 to processor 10 are digital data, indicating temperatures. These temperature data are relayed from a plurality of temperature sensors. One such sensor is shown herein as outside temperature sensor 20. It is a thermal sensor mounted outside of the building being serviced, which converts the temperature sensed into a digital signal. That signal is then frequency modulated and transmitted at a power level of less than a half watt, preferably in the citizens sub-band, typically used for garage door openers, etc. A similar structure is found in inside temperature sensor 22, which is one of serveral zone temperature sensors. In the preferred embodiment, temperature sensors 20 and 22 transmit data by a radio frequency telemeter only when the sensed temperature varies by a predetermined increment, such as one degree Fahrenheit. In some embodiments transmitters 20 and 22 can occasionally and nonsynchronously transmit data at a sufficiently short duty cycle so that contention between the various transmitters is improbable.

The controlling outputs of processor 10 are serially transmitted by transmitter 24. Transmitter 24 is a conventional system for inductively coupling into house wiring 26, a supersonic signal at about 120 kiloHertz. An example of such a transmitter is a model No. X-10, manufactured by BSR, although other transmitter types may be employed. The 120 kiloHertz carrier wave produced by transmitter 24 is modulated by digital output data from processor 10. Transmitter 24 cooperates with receivers, described hereinafter, that recognize codes generated by transmitter 24. The codes are used to identify one of several selectable receivers. In this manner, processor 10, in combination with transmitter 24, can command various receivers to perform tasks to be described presently.

One such receiver, shown herein as receiver 28, is connected across house wiring 26. Receiver 28 is connected to fire control apparatus (not shown) in central plant 30. In response to the receipt of coded signals, receiver 28 can turn central plant 30 on or off. In this embodiment, central plant 30 may be a forced hot air system, although other types of heating systems could be used instead. In addition, for some embodiments central plant 30 may be an air conditioning unit or a combined air conditioning and heating system.

A zone regulator, shown herein as register 32, has a damper 34 controlled by actuator 36, the latter to be described hereinafter in greater detail. A similar system duct 38, contains a rotatable damper 47 which is driven by actuator 42. Both actuators 36 and 42 include a receiver responsive to transmitter 24 and both are connected across house wiring 26.

Referring to FIG. 2, an example of the type of structure that may be found within the previously mentioned duct (duct 38 of FIG. 1) is illustrated. Previously mentioned duct 38 is shown containing a transverse axle 44 journalled in bearings 46A and 46B. Axle 44 extends beyond the outside of duct 38 and terminates at one end in pulley 48. A torsion spring 50 is wrapped around axle 44 to bias it into the illustrated open position. Appropriate stops may be included to limit the extent of travel of axle 44 to 90°. Mounted on axle 44 within duct 38 is damper 47, sized to close duct 38.

Mounted on the outside of duct 38 are motor M and its underlying, driven, gear reducer 52 whose output shaft 54 terminates in pulley 56. The two ends of cord 58, (which is not an endless loop), are separately wrapped around one of the pulleys 48 and 56, connecting them so that they rotate together. Shaft 54 is shown supporting a pair of cams 60 and 62 adjacent limit switches 64 and 66, respectively. Rotation of cams 60 and 62 can sequentially operate switches 64 and 66 in a manner described hereinafter. Limit switches 64 and 66 are mounted on control box 68 which contains the receiver (the receiver included in actuator 42 of FIG. 1) and which is described hereinafter in further detail. Control box 68 is mounted on gear reducer 52.

Referring to FIG. 3, limit switches 64 and 66 are shown mechanically coupled by dotted lines to motor M, to suggest the cam actuation. Motor M has one line connected to ground line G of house wiring 26. The receiver included in the actuator (actuator 42 of FIG. 1) is shown here as subsystem 72. It has a selection switch 74, whose pole connects to line H of the house wiring 26. The other two selectable output terminals of switch 74 are serially connected through switches 64 and 66, to the forward and reverse terminals, respectively, of motor M. Receiver 72 has a converter 76 which is coupled to power line H. Converter 76 demodulates the carrier contained on line H. When a coded signal is received, indicating the need to actuate selection switch 74, converter 76 causes switch 74 to move to the appropriate position.

To facilitate an understanding of the system, the operation of the apparatus of FIGS. 2 and 3 will be described prior to discussing the overall system operation. Assume the last signal received by converter 76 threw selection switch 74 to the position illustrated in FIG. 3. Damper 47 is assumedly in the closed position thereby opening limit switch 64 through cam 60. The next signal received by receiver 76 transfers switch 74 to connect line H to switch 66. This transfer of switch 74 completes a circuit through switch 66 to motor M, causing it to turn in a direction to open damper 47 (FIG. 2). Eventually, motor M rotates cam 62 sufficiently to actuate switch 66, as shown in FIG. 2. This occurs when damper 47 is parallel to the airway of duct 38. When switch 66 opens it interrupts current to motor M and stops it.

This system is a symmetrical one. A subsequent return of switch 74 to the position of FIG. 3 will cause motor M to reverse direction until switch 64 again opens. The limit switches 64 and 66 therefore open when damper 47 arrives in a first and second setting, nominally a closed and open position, respectively (although, in other embodiments, intermediate positions may be used as well).

To facilitate an understanding of the principles associated with the foregoing apparatus, the overall operation of the system of FIGS. 1–3 will briefly described in conjunction with the flow chart of FIG. 4. Initially, the user inserts input data to processor 12 via an associated keyboard in processor 12. Such incoming data may be displayed on CRT 14. For the present example, assume the following: the user inserts a monthly (or annual) schedule of target temperatures for the various zones; the schedule requires temperatures to cycle every day in the downstairs living rooms, while the bedrooms are at an opposite phase in the daily cycle; the processor 12 is instructed to establish different target temperatures for each zone; these target temperatures also change on a weekly basis, so that during business hours on weekdays, the temperatures throughout the entire house are reduced.

These data are shown being inserted into the computer architecture at the interface routine labeled as step S1 (FIG. 4). The function suggested by step S1 is the transferring of the above-listed scheduling information. Beyond the long-term instructions, the user can also insert ad-hoc schedules for emergencies. In step S2 data are transferred from processor 12 to processor 10. Processor 10 can then alert the system to the imminence of various changes in target temperatures. In step S2 the program of processor 10 takes into account annual/monthly/daily scheduling changes (including holidays which may be scheduled well into the future by relying on an internal, multiple year calendar).

Therefore, the long term schedules of step S2 have information on the time for the next change in target temperature for each zone. This information is analyzed during programming step S3, wherein the scheduled changes are anticipated. In step S3, anticipation is performed by a recursive subroutine which considers both the outside and the current inside temperature of each zone. Outside temperature and inside temperatures are telemetered by telemeters 20 and 22, respectively, to receiver 18 (FIG. 1). The received data are demodulated and provided as serial data to processor 10, thereby informing it of the temperature differences between the inside and outside of the house. In the preferred embodiment, the outside temperature data are fitted to one of a series of outside temperature cycles (which are stored in the internal memory of processor 10). Once this match has been made, it serves as an estimate of the trajectory of outside temperature. Thereafter, the program in step S3 breaks the time interval between scheduled temperature changes into a number of predetermined increments. Each increment is iteratively analyzed to determine the inside temperature change producible if the plant 30 were fired, thereby estimating the total temperature change over a relatively long-term period. The change in temperature can be calculated according to the following formula:

$$\Delta T = k(T-\tau)\Delta t$$

wherein k is a constant, T is the zone temperature in the last interval, and $\tau$ is th outside temperature. In this formula $\Delta T$ and $\Delta t$ correspond to changes in zone temperature and time, respectively. By using the foregoing equation, the program can predict the inside temperature trajectory and determine whether by firing the furnace now the desired change in temperature will be achieved in time to meet the scheduled change in target temperatures. If it is too early to start the temperature change, then no further actions are performed. However, if the calculation indicates the temperature change must be started now, then the change-in-target-temperature information is relayed to the next programming routine, step S4. Service routine S4 is a form of feedback control wherein the current and anticipated target temperatures, calculated and transmitted from step S3, directly control the starting and stopping of furnace 30.

In step S4 the current zone temperature is sensed by remembering the transmitted changes in zone temperature conveyed by the telemetry of transmitter, 22 to receiver 18. Each of the current zone temperatures is compared to the specific target. Thereafter, the deviation of each is summed and compared to a threshold sum. Citing an example: if there are four zones, the system can wait until the total error for all four zones equals four Fahrenheit degrees. This error may be comprised of a one degree error in each zone, or one zone may be four Fahrenheit degrees in error (perhaps due to a temperature target being changed in anticipation). Various weights may also be applied to each zone. In one possibility, a relatively large or drafty room can be given a higher weight, allowing an early response for this especially needy room.

Whenever the predetermined diviation limit is exceeded, service routine S4 commands furnace 30 to start. This command is conveyed by applying an appropriate digital signal to transmitter 24, which then produces an encoded carrier signal on house wiring 26. The encoded signal corresponds to a preset code in receiver 28 of furnace 30. In response, furnace 30 is started and heated air is forced through the ducts and registers, such as duct 38 and register 32. As a result, the various zones will now increase in temperature. When a one Fahrenheit degree increment occurs in a zone, its associated transmitter, such as transmitter 22, signals the incrementation to receiver 18. This datum is then fed to processor 10 to update its stored information. In the preferred embodiment, heating continues until a zone rises to a predetermined level above the target, preferably 2 Fahrenheit degrees. Thereafter, heat is throttled from that zone by operating the appropriate register or duct damper. For example, a zone can be throttled by transmitting (from processor 10 and transmitter 24) an encoded signal which is received by receiver/actuator 42 (FIG. 1). As a result, damper 47 is rotated to a closed position. Alternatively, receiver/actuator 36 can be energized to close damper 34 over register 32. When the last zone achieves a temperature two Fahrenheit degrees above its target, processor 10 and transmitter 24 transmit an encoded signal to receiver 28 (FIG. 1). In response, furnace 30 is stopped.

The cycling of temperatures in the various zones is synchronous. Each of the zones is slightly overheated, so that they can decline in temperature together. Because of the nature of the system, heat is applied to the various zones simultaneously, rather than serially. This process avoids the inefficient situation where the furnace is started to heat one zone and then stops—only to shortly restart itself for a second zone.

In applications where the furnace has residual heat, as in a hot water system, service routine S4 anticipates every zone imminently reaching a temperature which exceeds the target by the desired increment (such as two Fahrenheit degrees). This anticipation can be stored in the program as either a temperature offset or a time lag. If the latter method is used, the system observes the time rate of temperature change to estimate its continued trend. The time lag feature assumes that the rate will persist after the furnace shuts down.

In applications where a particular zone is known to be a very difficult one to heat (because of size or poor insulation), the zone actuators can be opened at different times. For example, if one assumes that duct 38 services a zone having a high demand, only actuator 42 will be open when furnace 30 is started. Once the temperature in that zone begins to rise appreciably the other zones will be serviced. Similarly, that high-need zone serviced by duct 38 may be scheduled to close last to ensure that its temperature is properly set before the furnace is stopped.

It is expected that the temperature sensors, such as sensor 22, will incorporate switches to override some of the scheduled targets in processor 10. Citing an example, sensor 22 (FIG. 1) can have an "on/auto/off switch." In the "off" position the room temperature is not normally regulated. In the "off" position temperature will not be allowed to reach uncontrolled extremes. A room temperature can be kept within a safe range of 45 to 95 degrees Fahrenheit, for example. In the "automatic" position the system operates as previously described. In the "on" position heat is forced to reach predetermined comfort level, thereby overriding any scheduled, and perhaps uncomfortable, target temperature. These features may be employed without providing input to processor 12. Also, sensor 22 can have a fine temperature adjustment control for changing the comfort level (or target temperature) established for a room by a few degrees in a simple, manual fashion. In the present application, comfort level is defined as a preset temperature normally preferred by occupants of the zone. The comfort level could be established at 68 degrees Fahrenheit in winter and 74 degrees Fahrenheit in summer.

Multiply zoning an air conditioning system with a single plant presents a special problem. When airflow is restricted, as occurs when one or more zone regulator dampers is in the closed position, the evaporator coil temperature drops to below the freezing point of water. This causes the condensate from the conditioned air to freeze, which further restricts the airflow and causes the icing process to accelerate.

In the present system, the early formation of condensate ice is sensed via tubes of a differential pressure sensor (in sensor 22), respectively, to the supply and register sides of the evaporator coil in the plenum duct. The other ends of said tubes are brought outside of said plenum duct and terminated in a piezoelectric differential pressure sensor. Control means 10 periodically "reads" the pressure differential in order to detect the initial stages of icing, as indicated by a greater than average (e.g. mean pressure difference plus 3 standard deviations), pressure differential. Upon detection of the above condition, processor 10 will shut off the air conditioning compressor (but not the blower) until the pressure difference falls below a predetermined threshold.

Various modifications may be implemented with respect to the above-described preferred embodiment. For example, subroutines may be altered or reordered, depending upon the priorities set by a particular user or application. Also, the processors employed herein can perform other tasks. For example, if an excessively low temperature is detected, an emergency situation can be declared which triggers a trickle flow through certain water pipes to prevent freezing. The system can also be arranged to ignore data that indicates a failure in a zone. Citing an example: a zone which has a defective sensor may transmit erroneous temperatures so deviant from the norm that the system will ignore that information. Furthermore, while various data links are provided herein from the temperature sensors and actuators to the processor, hard-wiring, or other means of data transmission may be employed, depending upon practical considerations. Also while a pair of microprocessors are described herein, it is expected that a different number of processors or a single larger computer, or minicomputer, may be used. Furthermore, the system can operate with various types of heating and cooling systems, provided each can be fitted with a regulator to adjust temperature differently in the various zones. Also, the several components used herein can be altered, depending upon the desired strength, temperature stability, speed of response, etc.

Obviously, many modifications and variations of the present invention are possible in light of the above teachings. It is, therefore, to be understood that within the scope of the appended claims, the invention may be practiced otherwise than as specifically described.

What is claimed is:

1. In a thermal system having a central plant feeding a plurality of adjustable zone regulators for bringing their respective zones to corresponding target temperatures, a controller comprising:

a plurality of temperature sensors distributed one to a zone, each of said sensors being operable to produce a zone signal signifying zone temperature;

a plurality of zone actuators, each having a zone control terminal and each, in response to a signal at its zone control terminal, being operable to adjust a corresponding one of said zone regulators; and a control means coupled to each of the temperature sensors and to the zone control terminal of each of said zone actuators for calculating the zone temperature errors with respect to their respective target temperatures and for starting said central plant response to a predetermined function of the cumulative zone temperature errors exceeding a given limit, each of said zone temperature errors being at least producible at above said given limit and at a plurality of non-zero values smaller in magnitude than that of said given limit so that the zone temperature errors may be insufficient individually but sufficient cumulatively to start said central plant, said control means being operable to apply corresponding signals to each zone control terminal with a timing determined by its corresponding temperature error.

2. In a thermal system according to claim 1 wherein said predetermined function is a given function of a linear combination of the zone temperature errors.

3. In a thermal system according to claim 2 wherein said control means is operable to vary each of said target temperatures according to a predetermined schedule.

4. In a thermal system according to claim 3 wherein said control means is operable to schedule non-synchronous changes in the target temperatures of the zones.

5. In a thermal system according to claim 3 wherein said control means is operable to calculate the lead time required to bring one zone to the next scheduled target temperature, said control means being operable to start said plant when said lead time corresponds to the time scheduled for said next scheduled target temperature.

6. In a thermal system according to claim 5 further comprising:

an outside sensor coupled to said control means for providing to it an outside signal signifying outside temperature, said control means being operable to calculate said lead time as a function of the outside signal.

7. In a thermal system according to claim 6 wherein said control means comprises:

a memory for storing a daily pattern corresponding to expected daily temperature variations, said control means being operable to extrapolate to a predicted difference between inside and outside temperature as a function of at least said outside signal and said daily pattern.

8. In a thermal system according to claim 1 having a power line wherein said control means comprises:

a transmitter for coupling an encoded carrier signal onto said power line, each of said zone actuators including:

a receiver coupled to said power line for decoding said carrier signal before adjusting the corresponding one of said zone regulators.

9. In a thermal system according to claim 8 wherein each of said zone actuators comprises:

a motor coupled to a corresponding one of said zone regulators; and a pair of limit switches responsive to said motor driving its zone regulator to two opposite extremes, said motor being coupled to said limit switches, said receiver being operable to drive said motor toward either of the extremes until a corresponding one of said limit switches is operated.

10. In a thermal system according to claim 9 wherein said receiver includes a selection switch for alternatively coupling said power line to one of said pair of limit switches, said motor having forward and reverse power terminals, said limit switches being serially connected between said selection switch and a different corresponding one of said power terminals of said motor.

11. In a thermal system according to claim 8 wherein each of said temperature sensors comprises:

a radio frequency telemeter for transmitting data to said control means.

12. In a thermal system according to claim 11 wherein said telemeter transmits its data in response to said zone signal changing a predetermined amount since last transmission.

13. In a thermal system according to claim 4 wherein said control means comprises a digital processor.

14. In a thermal system according to claim 1 wherein said actuators each has a first and second setting, said control means being operable to discretely control said actuator between the first and second setting.

15. In a thermal system according to claim 1 wherein said plant includes a cooling stage and wherein said controller comprises:

a differential pressure sensor coupled around said cooling stage for providing a signal to said control means, said control means being operable to disable said cooling stage in response to the signal of said pressure sensor being in a predetermined unacceptable range.

16. A method for regulating temperatures with a central plant feeding a plurality of zone regulators at respective zones, comprising the steps of:

measuring the error in temperature in each zone from a corresponding target temperature;

calculating a cumulative value from a predetermined function of said errors;

starting said central plant when said cumulative value exceeds a predetermined limit; and adjusting each of said zone regulators to an extent determined by its corresponding error in temperature.

17. A method according to claim 16 further including the step of:

starting the central plant earlier to anticipate a scheduled change in target temperature in at least one zone.

18. A method according to claim 16 wherein the starting of said central plant is varied as a function of outside temperature.

* * * * *